United States Patent
Cannon et al.

(10) Patent No.: US 6,269,257 B1
(45) Date of Patent: Jul. 31, 2001

(54) ADAPTIVE PAGING SIGNAL IN CORDLESS TELEPHONE

(75) Inventors: Joseph M. Cannon, Harleysville; James A. Johanson, Macungie; Philip David Mooney, North Wales, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/234,737

(22) Filed: Jan. 21, 1999

(51) Int. Cl.[7] .................................................. H04M 1/00
(52) U.S. Cl. ..................... 455/567; 455/462; 455/355; 340/7.1; 340/7.58
(58) Field of Search .................................. 455/567, 575, 455/38.2, 462, 414, 355, 352; 340/825.44

(56) References Cited

U.S. PATENT DOCUMENTS

| | | | |
|---|---|---|---|
| 4,640,987 | * 2/1987 | Tsukada et al. | 455/462 |
| 5,170,499 | * 12/1992 | Grothause | 455/238.1 |
| 5,373,548 | * 12/1994 | McCarthy | 455/462 |
| 5,404,582 | * 4/1995 | Demuro et al. | 455/90 |
| 5,406,617 | * 4/1995 | Bauer | 455/462 |
| 5,448,620 | * 9/1995 | Gershkovich et al. | 455/552 |
| 5,463,659 | * 10/1995 | Nealon et al. | 375/202 |
| 5,870,684 | * 2/1999 | Hoashi et al. | 455/567 |
| 5,999,799 | * 12/1999 | Hu et al. | 455/67.7 |

FOREIGN PATENT DOCUMENTS

| | | | |
|---|---|---|---|
| 0865188 | 9/1998 | (EP) | H04M/1/72 |
| 0876040 | 11/1998 | (EP) | H04M/1/72 |
| 0887779 | 12/1998 | (EP) | G08B/21/00 |
| 2308785 | 7/1997 | (GB) | H04M/19/04 |
| 94/06254 | 3/1994 | (WO) | H04Q/7/04 |
| 99/05850 | 2/1999 | (WO) | H04M/19/04 |

\* cited by examiner

*Primary Examiner*—William Trost
*Assistant Examiner*—Rafael Perez-Gutierrez
(74) *Attorney, Agent, or Firm*—John P. Veschi

(57) ABSTRACT

In one embodiment, a cordless telephone according to the invention includes a base unit, including a paging mechanism, and a handset, including an alerting mechanism responsive to the paging mechanism. At least one of the base unit and the handset includes a page adjusting mechanism to affect an alerting signal output from the alerting mechanism based on a condition. Thus, the paging signal is adaptive to increase the opportunity for a user to determine the location of a misplaced handset. In another embodiment, a cordless telephone is equipped so that the base unit can provide an indication related to a distance between the base unit and the handset. In yet another embodiment, a cordless telephone is equipped so that the paging mechanism is adjusted based on user control. In a further embodiment according to the invention, a method is provided for affecting an alerting signal output by an alerting mechanism of a cordless telephone handset. The method includes the steps of sensing a condition, and affecting the alerting signal based on the sensed condition.

12 Claims, 3 Drawing Sheets

ADAPTIVE PAGING SIGNAL IN CORDLESS TELEPHONE

FIELD OF THE INVENTION

This application is related to the field of cordless telephony, and more particularly to a paging feature that enables a user to locate a misplaced cordless telephone handset.

BACKGROUND OF THE INVENTION

Cordless telephones are made up of a base unit, which is traditionally connected to a telephone wall outlet and to an AC power outlet, and is thus fixed in location, and a portable handset. The handset is normally in one of two positions. In a first position, the handset is coupled to the base unit, such as by being cradled thereto, and is normally receiving charging power from the base unit through a set of charge contacts. When in this position, the telephone is in an on-hook condition, i.e., is not connected to the central office or to another telephone or otherwise engaged in telephony activities.

In a second position, the handset is de-coupled from the base unit and is capable of communicating with the base unit through RF communications. When in this position, the telephone may be in either an on-hook condition or an off-hook condition. When in the off-hook condition, a user engages in telephony activities by using the handset. The handset maintains an RF link with the base unit, and the base unit establishes wired connection to the central office and the public switched telephone network (or to an internet service provider based network or any other form of network).

The major advantage of cordless telephones, when compared to traditional wired telephones, is that cordless telephones do not require the user to remain at one given location while engaged in telephony activities. Instead, the user is able to roam within range of the base unit, and as long as the handset is within range, the user can engage in telephony activities such as initiating outgoing telephone calls and receiving incoming telephone calls. Typically, as cordless telephone technology advances, the range of the RF link between the base and handset continues to increase. This is partly due to the use of higher powered RF frequencies which are allowed due to the use of digital, as opposed to analog, communication techniques, enabling more advanced digital signal processing features, such as frequency hopping, spread spectrum, forward error correction, etc.

A drawback of cordless telephones is that the capability to roam with the handset also creates the opportunity for a user to misplace the handset. For example, a user may roam within the user's home while engaged in a telephone conversation, and when the conversation is complete the user may simply put the handset down in any convenient spot. If the user becomes otherwise distracted, the user may forget where the user placed the handset when the user later desires to place a new outgoing telephone call. To address this problem, cordless telephones have developed a feature, typically referred to as the "page" or "handset locator" feature, whereby the user presses a page button on the base unit to cause the handset to provide an audible signal, typically a short three-"beep" signal.

A drawback of conventional page signals is that they are the same regardless of the environmental conditions. As the allowable range between the base and handset gets bigger, this can yield a problematic situation wherein the user cannot effectively employ the page feature since the user either cannot hear the short audible signal, or cannot accurately determine the source of the audible signal before it terminates. There is therefore a need for a cordless telephone with an adaptive paging feature to adjust to the conditions so that a user can effectively locate a misplaced handset.

SUMMARY OF THE INVENTION

In one embodiment, a cordless telephone according to the invention includes a base unit, including a paging mechanism, and a handset, including an alerting mechanism responsive to the paging mechanism. At least one of the base unit and the handset includes a page adjusting mechanism to affect an alerting signal output from the alerting mechanism based on a condition. Thus, the paging signal is adaptive to increase the opportunity for a user to determine the location of a misplaced handset.

In another embodiment, a cordless telephone is equipped so that the base unit can provide an indication related to a distance between the base unit and the handset. In yet another embodiment, a cordless telephone is equipped so that the paging mechanism is adjusted based on user control.

In a further embodiment according to the invention, a method is provided for affecting an alerting signal output by an alerting mechanism of a cordless telephone handset. The method includes the steps sensing a condition, and affecting the alerting signal based on the sensed condition.

BRIEF DESCRIPTION OF THE DRAWING

The advantages of the invention will be apparent to one of skill in the art upon review of the following detailed description in light of the drawings, wherein.

DETAILED DESCRIPTION

Figure 1:
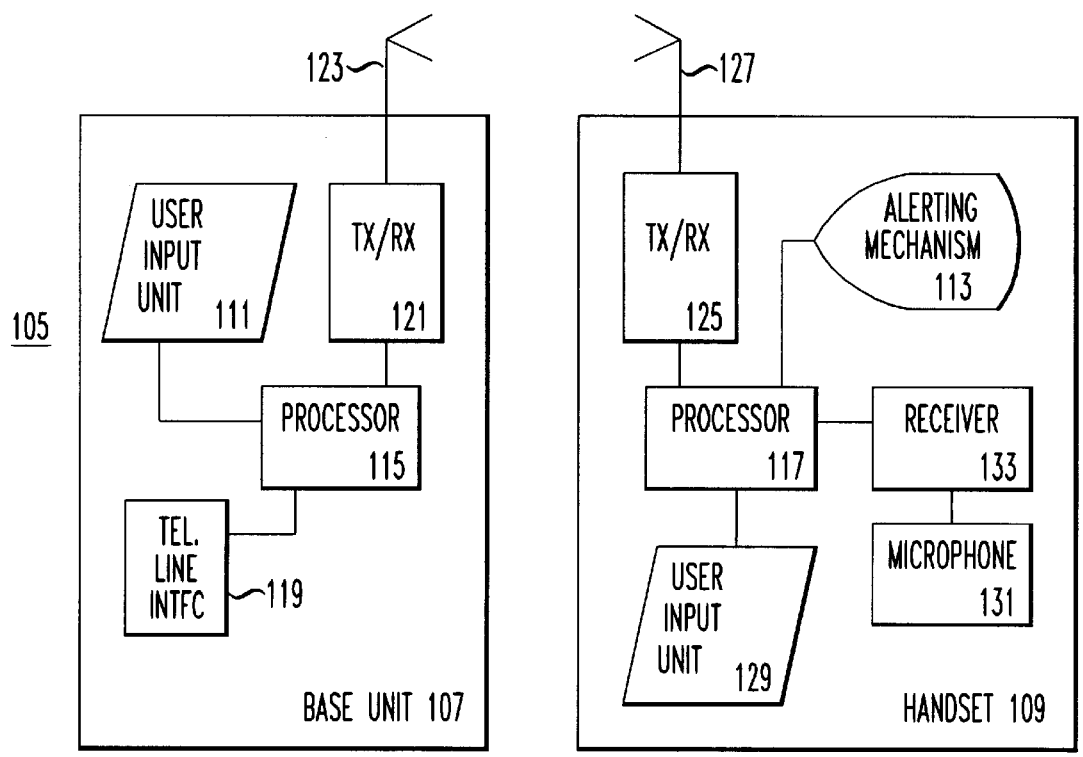
FIG. 1 is a simplified block diagram of one embodiment of a cordless telephone according to the invention.

FIG. 1 is a simplified block diagram of a cordless telephone according to the invention. Cordless telephone 105 includes a base unit 107 and a handset 109. Base unit 107 includes a user input unit 111, such as a keypad, via which a user may initiate a page function, such as by pressing a particular key of the keypad. Handset 109 includes an alerting mechanism 113, such as a speaker, that will issue an alerting signal in response to an indication that the user initiated the page function. According to the invention, at least one of the base unit 107 and the handset 109 includes a page adjusting mechanism, such as a function block in processor 115 (base unit 107) or processor 117 (handset 109), and the page adjusting mechanism affects the alerting signal based on a condition.

Base unit 107 also includes a telephone line interface 119 for coupling to a telephone line and hence to a network, such as to a public switched telephone network via a central office. Base unit 107 also includes a transmit/receive element 121 and an antenna 123 for RF communication with handset 109 via corresponding elements 125 and 127. The details of RF communication between base units and handsets of cordless telephones are well known to those of skill in the art and will not be discussed herein in detail. Transmit/receive elements 121 and 125 are intended to include all of the typical devices employed for this function.

Handset 109 also includes a user input unit 129, such as a keypad, a microphone 131 and a receiver 133. These elements also function primarily in conventional ways that are well known to those of ordinary skill in the art, and these traditional functions will not be discussed in detail.

Operationally, when the handset 109 is not coupled to base unit 107, and is misplaced, the user activates the page function by, for example, pressing a PAGE key that is part of user input unit 111. A paging mechanism functional block of processor 115 receives an indication of this activation from user input unit 111 by way of traditional conditioning elements and signal transmission media, and causes transmit/receive element 121 to output a particular signal over the RF link to handset 109. In handset 109, processor 117 reacts to the particular signal by activating alerting mechanism 113.

Processors 115 and 117 may be microprocessors or digital signal processors, such as the DSP 1609 available from Lucent Technologies. According to the invention, either processor 115 and/or processor 117 takes a conditional action during the aforementioned process. For example, processor 115 may adjust the particular signal based on a condition, or processor 117 may adjust the signal provided to alerting mechanism 113 based on a condition.

One example of a condition upon which the processor(s) 115/117 may make such an adjustment is a receive signal strength indication (RSSI). Traditionally, DSPs in cordless telephones determine the received signal strength of the signals between the base and handset to determine whether to switch to a different communication channel for the RF link. Thus, those of skill in the art are familiar with this measure and are familiar with the fact that it provides an estimate of channel quality. Further, those of skill in the art are familiar with an axiom by which the signal strength tends to be indirectly related to the distance between the base unit and the handset. Thus, signal strength is a good estimate of this distance. The invention, in one embodiment, takes advantage of this known measure to adjust the alerting signal. In an alternative embodiment, averaging RSSI across many frequencies may be employed to improve the estimate.

An advantage of adjusting the alerting signal based on the received signal strength indication is that it enables the alerting signal to be louder, to last longer or to have particular tonal qualities (i.e. pitch) when the signal strength is low, thereby providing the user with a better opportunity to locate the misplaced handset. Received signal strength is used here as an example of a condition upon which to estimate the distance between the base unit 107 and the handset 109. This is purely by way of example and not of limitation. Any other measure that bears a relationship to the distance between the base unit 107 and the handset 109 may be employed.

For example, the amount of time it takes for a signal to travel from the base unit 107 to the handset 109 and/or from the handset 109 to the base unit 107, also known as the "signal delay" may be employed. Another exemplary measure is any error measure, such as cyclic redundancy check (CRC), that demonstrates an increase in the error ratio based on lower channel quality, and hence provides an estimate of distance.

Also, it is possible to use multiple measures as estimates of the distance between base unit 107 and handset 109, and to follow an algorithmic approach to developing an estimate with a higher confidence level. For example, the distance estimate may be based on measures of signal strength (or signal delay, or error level) in both directions between the base unit 107 and the handset 109. Further, it is possible to use both signal delay and received signal strength, or any other combination of measures, to develop the distance estimate.

Figure 2:
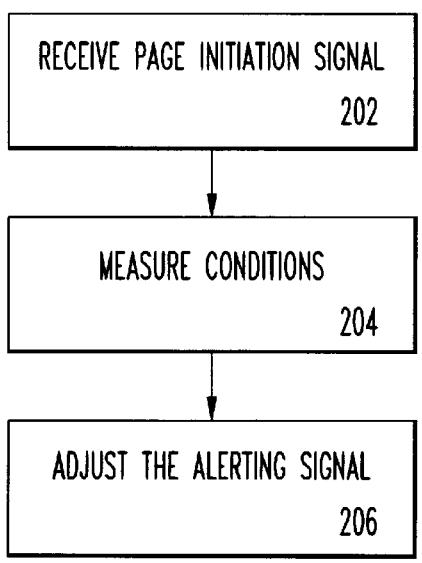
FIG. 2 is an exemplary flowchart of operation of a cordless telephone according to the invention.

FIG. 2 is an exemplary operational flowchart according to the invention. Here, at step 202 the base unit 107 receives a page initiation signal, such as from a user pressing a particular key of user input unit 111. At step 204, a measure of a condition is made by either base unit 107 or handset 109, and at step 206 the alerting signal is adjusted based on the measure. The ordering of the steps 202 and 204 is purely by way of example and not of limitation. It is, of course, possible for the measure to have been made prior to the receipt of the paging signal and stored, for example, in a register.

For example, either the base unit 107 or the handset 109 can make routine measurements during a telephone call, and the alerting signal may be set based on the presumption that the handset is located at the same place it was located when the telephone call was completed (for if the handset was returned to the base unit, a paging operation would not be necessary). According to this example, if the page adjusting unit is in the base unit 107, then the base unit 107 will affect the particular signal based on the measure. In one example, the particular signal can inform the handset 109 of the distance estimate (or the actual measurement upon which the distance was estimated). In another example, the particular signal can set the level of the alerting signal for the handset, either in terms of volume, duration, pitch, cadence, or any combination of these and any other alert signal characteristics.

According to another example, the handset 109 includes the page adjusting mechanism, and the base unit 107 merely informs the handset 109 of the paging activity in a traditional manner, whereby the particular signal is a traditional signal. In this case, the page adjusting mechanism of processor 117 may, for example, read a measure value from a register therein and adjust the alerting signal accordingly.

As mentioned earlier, it is also possible to take the measure based on the particular signal. For example, after receipt of the particular signal in step 202, the handset 109 can output a signal to base unit 107 which base unit 107 can measure, and/or can receive a signal from base unit 109 which handset 107 can measure. These real time measures can then be utilized to determine the appropriate level(s) for the alerting signal.

It is of course also possible to use the particular signal as the measured signal. In this way, the handset 109 will receive the particular signal and recognize it as the signal informing it to begin to issue an alerting signal, and will also measure the strength of the particular signal (or some other characteristic thereof—such as comparing the time of receipt to a time stamp thereon) and adjust the alerting signal based on this measure.

Figure 3:
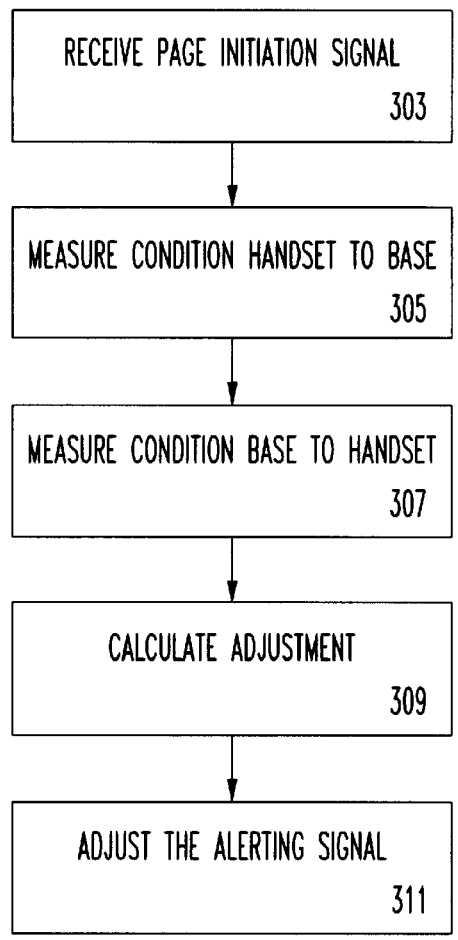
FIG. 3 is another exemplary flowchart of operation of a cordless telephone according to the invention.

FIG. 3 depicts one of the many alternative operational methods, wherein the page initiation signal is received at step 303, a signal is issued from the handset 109 to the base 107 and measured by the base 107 at step 305, and a second signal is issued from base 107 to handset 109 (perhaps informing handset 109 of the measure from step 305) at step 307. At step 309, processor 117 calculates an adjustment to the alerting signal, and at step 311 the alerting signal is adjusted.

Figure 4:
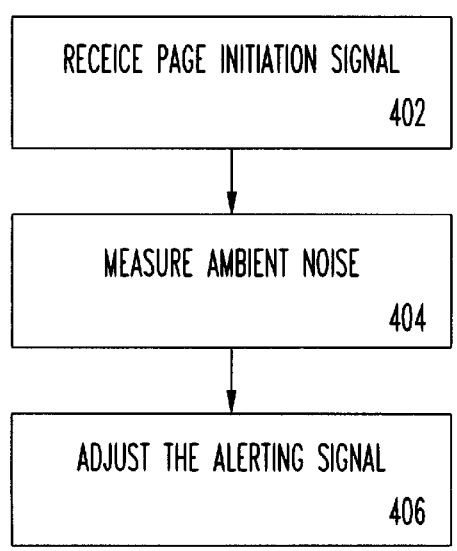
FIG. 4 is another exemplary flowchart of operation of a cordless telephone according to the invention.

FIG. 4 depicts an alternative method of operation according to the invention, whereby a measure of ambient noise is employed, either alone or in combination with one of the aforementioned embodiments, to adjust the alerting signal. Here, the page initiation signal is received at step 402, and a measure of ambient noise is made at step 404. In one example, step 402 includes the issuance of the particular signal from base unit 107 to handset 109, and in response thereto, microphone 131 and receiver 133 are employed to capture a measurement of the ambient noise. This measure can then be employed to adjust the alerting signal in step 406.

Figure 5:
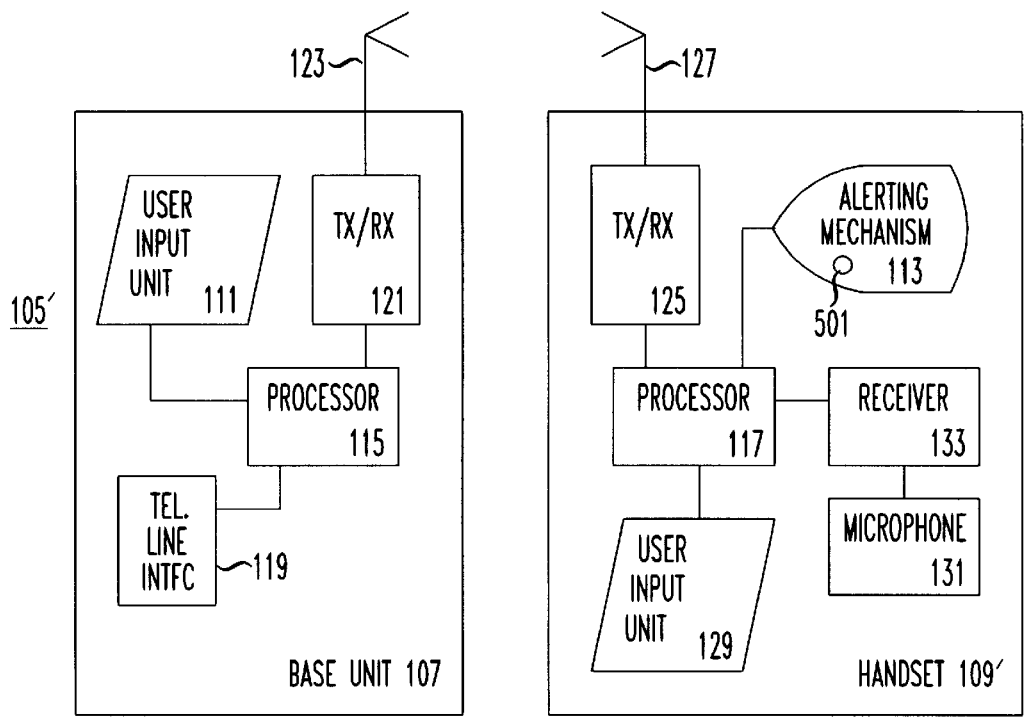
FIG. 5 is a simplified block diagram of another embodiment of a cordless telephone according to the invention.

For example, the alerting signal can be adjusted to exceed the ambient noise in volume by a particular amount. Alternatively, or additionally, the pitch or other qualities of the alerting signal can be selected so that they do not overlap with those of the ambient noise. In this way, the likelihood of the user hearing the alerting signal is improved. Further, the ambient noise measure may be employed to determine that another signal, other than an audible signal, should be produced. For this example, a telephone such as telephone 105' shown in FIG. 5 can include a visual indicator, such as light emitting diodes (LEDs) 501 on handset 109'.

Figure 6:
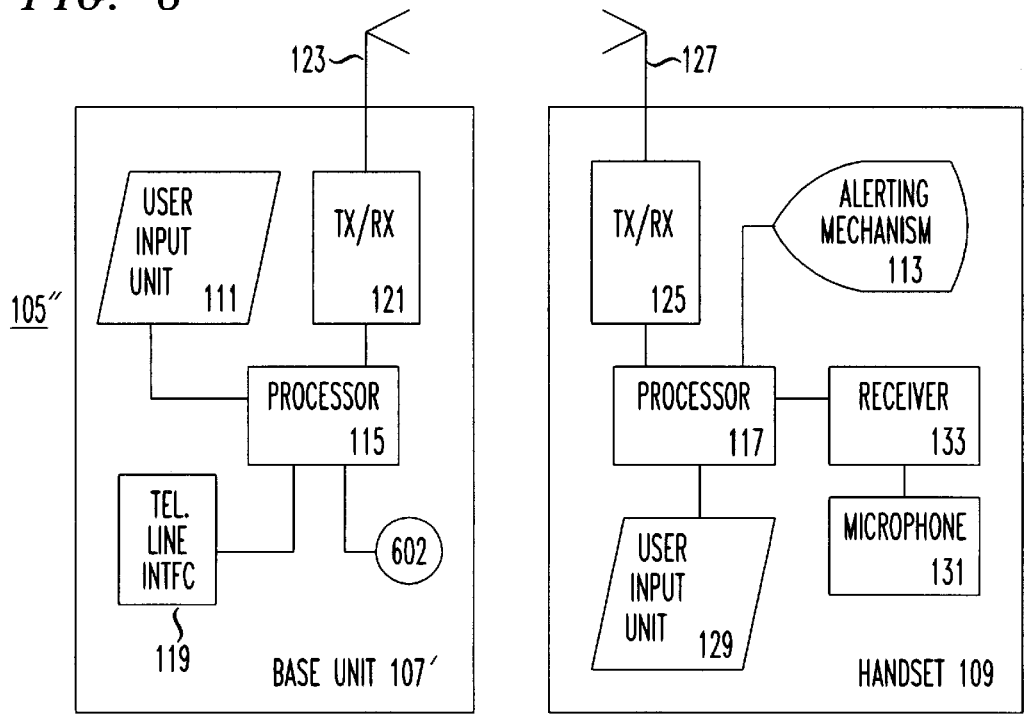
FIG. 6 is a simplified block diagram of another embodiment of a cordless telephone according to the invention.

FIG. 6 shows telephone 105" in another embodiment according to the invention. Here, base unit 107' includes an LED 602 or other indicator that informs the user of the proximity of the handset 109 to the base unit 107'. In a simple example, based on received signal strength, signal delay, or another measure discussed above and falling within the scope of the present invention, processor 115 causes LED 602 to be illuminated if handset 109 is estimated to be more than a threshold distance away from base unit 107'. For example, if the estimate is that handset 109 is more than 25 feet from base unit 107', then LED 602 is illuminated to inform the user that handset 109 is in a different room in the house, and the user should thus search a greater radius of area than may otherwise have been intended.

Alternatively, the indicator may comprise a plurality of LEDs or some other form of scale that provides the user with a general indication of how far away the handset 109 is from base unit 107'. In yet another alternative embodiment, user input unit 111 may include a button which the user can activate that will instruct the handset 109 to maintain the alerting signal until the user activates a button on the handset 109, and have the alerting signal vary its characteristics based, for example, on user programming. For example, the user can hold a page button in a depressed or active position and the volume of the alerting signal will increase proportionately with the length of time the button is depressed, such that the user can activate the page feature until the user can hear the alerting signal. Alternatively, the characteristic such as volume can vary automatically, such as based on the amount of time elapsed since initiation.

Various novel embodiments are thus provided to improve the ability of a user to locate a misplaced cordless telephone handset. Upon reviewing the description of the invention, various additional alternative embodiments and variations of the inventive concept will undoubtedly be evident to those of skill in the art, and these variations are of course intended to fall within the scope of the present invention. For example, although the inventive concepts are described with respect to cordless telephony, they are equally applicable to other embodiments wherein a user may locate a misplaced item through use of a paging feature, such as the location of a misplaced television remote control.

What is claimed is:

1. A cordless telephone comprising:
   a base unit, including a paging mechanism; and
   a handset, including an alerting mechanism responsive to the paging mechanism, wherein at least one of the base unit and the handset includes a page adjusting mechanism to affect an alerting signal output from the alerting mechanism based on an estimate of the distance between the base unit and the handset, wherein the estimate is based on at least one measure related to a signal from the base unit to the handset, and at least one measure related to a signal from the handset to the base unit.

2. A cordless telephone, comprising:
   a base unit, including a paging mechanism; and
   a handset, including an alerting mechanism responsive to the paging mechanism,
   wherein at least one of the base unit and the handset includes a page adjusting mechanism to affect an alerting signal output from the alerting mechanism based on an estimate of the distance between the base unit and the handset, wherein the adjustino, mechanism affects at least one of a duration, a volume, and a tonal quality of the alerting signal.

3. A cordless telephone as recited in claim 1, wherein the adjusting mechanism affects the alerting signal to have a duration based on the estimate of the distance between the base unit and the handset.

4. A cordless telephone as recited in claim 1, wherein the adjusting mechanism affects the alerting signal to have a volume based on the estimate of the distance between the base unit and the handset.

5. A cordless telephone as recited in claim 1, wherein the adjusting mechanism affects the alerting signal to have a particular tonal quality based on the estimate of the distance between the base unit and the handset.

6. A cordless telephone, comprising:
   a base unit; and
   a handset,
   wherein one of the base unit and the handset includes a paging mechanism and the other includes an alerting mechanism responsive to the paging mechanism, and
   wherein at least one of the base unit and the handset includes a page adjusting mechanism to affect an alerting signal output from the alerting mechanism based on a condition related to a location of the handset, wherein the condition is one of a signal delay measurement and an error correction measurement.

7. A cordless telephone as recited in claim 6, wherein the condition is a signal delay measurement.

8. A cordless telephone as recited in claim 6, wherein the condition is an error correction measurement.

9. A cordless telephone, comprising:
   a base unit, including a paging mechanism; and
   a handset, including an alerting mechanism responsive to the paging mechanism,
   wherein at least one of the base unit and the handset includes a page adjusting mechanism to affect an alerting signal output from the alerting mechanism based on a signal delay measurement.

10. A method of affecting an alerting signal output by an alerting mechanism of a cordless telephone handset, comprising the steps of:

sensing a condition; and affecting the alerting signal based on the sensed condition, wherein the sensed condition is a signal delay measurement.

11. A cordless telephone, comprising:

a base unit, including a paging mechanism; and a handset, including an alerting mechanism responsive to the paging mechanism, wherein at least one of the base unit and the handset includes a page adjusting mechanism to affect an alerting signal output from the alerting mechanism based on an error correction measurement.

12. A method of affecting an alerting signal output by an alerting mechanism of a cordless telephone handset, comprising the steps of:

sensing a condition; and affecting the alerting signal based on the sensed condition, wherein the sensed condition is an error correction measurement.

* * * * *